US012698105B2

(12) United States Patent
Yuan et al.

(10) Patent No.: US 12,698,105 B2
(45) Date of Patent: Aug. 4, 2026

(54) VARIABLE-STROKE SELF-ADAPTIVE ADJUSTMENT QUASI-ZERO STIFFNESS DEVICE AND PARAMETER CHECKING METHOD

(71) Applicant: BEIJING INSTITUTE OF CONTROL ENGINEERING, Beijing (CN)

(72) Inventors: Li Yuan, Beijing (CN); Li Wang, Beijing (CN); Lin Li, Beijing (CN); Yanpeng Wu, Beijing (CN); Jun Zhong, Beijing (CN); Qin Zhao, Beijing (CN); Ran Zheng, Beijing (CN); Jingya Qi, Beijing (CN); Chengyu Zhang, Beijing (CN)

(73) Assignee: Beijing Institute of Control Engineering, Beijing (CN)

( * ) Notice: Subject to any disclaimer, the term of this patent is extended or adjusted under 35 U.S.C. 154(b) by 285 days.

(21) Appl. No.: 18/685,965

(22) PCT Filed: Aug. 16, 2022

(86) PCT No.: PCT/CN2022/112709
§ 371 (c)(1),
(2) Date: Feb. 23, 2024

(87) PCT Pub. No.: WO2023/024968
PCT Pub. Date: Mar. 2, 2023

(65) Prior Publication Data
US 2024/0367823 A1     Nov. 7, 2024

(30) Foreign Application Priority Data

Aug. 23, 2021   (CN) ........................ 202110978217.X

(51) Int. Cl.
| | |
|---|---|
| *B64G 7/00* | (2006.01) |
| *G06F 30/23* | (2020.01) |
| *G06F 119/14* | (2020.01) |

(52) U.S. Cl.
CPC ............... B64G 7/00 (2013.01); G06F 30/23 (2020.01); G06F 2119/14 (2020.01)

(58) Field of Classification Search
CPC ....... B64G 7/00; G06F 30/23; G06F 2119/14; G06F 30/20; G01C 21/02; G01C 21/24; G01M 11/04; Y02T 90/00
See application file for complete search history.

(56) References Cited

U.S. PATENT DOCUMENTS 9,920,793 B1     3/2018  Churchill et al.

FOREIGN PATENT DOCUMENTS

| | | |
|---|---|---|
| CN | 103482088 A | 1/2014 |
| CN | 105530514 A | 4/2016 |

(Continued)

OTHER PUBLICATIONS

International Search Report for corresponding PCT/CN2022/112709, mailed Oct. 12, 2022, 5 pages. (Chinese and English Language).

*Primary Examiner* — Thomas M Hammond, III
(74) *Attorney, Agent, or Firm* — Maginot, Moore & Beck, LLP

(57) ABSTRACT

A variable-stroke self-adaptive adjustment quasi-zero stiffness device includes an integrating sphere, a target, a collimator, a pointing measuring instrument, a disturbance source, an inertia simulation tooling, a quasi-zero stiffness suspension adjustment device and an optical air-bearing platform. The integrating sphere, the target and the collimator are coaxially mounted on the optical air-bearing platform in sequence. The pointing measuring instrument is con- (Continued)

nected and fixed with the inertia simulation tooling through a screw; three disturbance sources are mounted on the inertia simulation tooling to provide small disturbance and inertia for the pointing measuring instrument; the quasi-zero stiffness suspension adjustment device suspends the inertia simulation tooling to provide a free boundary environment; and the quasi-zero stiffness suspension adjustment device, the pointing measuring instrument, the disturbance source and the inertia simulation tooling form a set of two-pendulum system as a whole.

7 Claims, 4 Drawing Sheets

(56) References Cited

FOREIGN PATENT DOCUMENTS

| CN | 106477074 | A |   | 3/2017  |                       |
|----|-----------|---|---|---------|-----------------------|
| CN | 106599480 | A | * | 4/2017  | ............. G06F 30/23 |
| CN | 107941441 | A | * | 4/2018  | ............. G01M 7/00  |
| CN | 108801574 | A | * | 11/2018 | ............. G01M 7/06  |
| CN | 109540493 | A |   | 3/2019  |                       |
| CN | 110929388 | A | * | 3/2020  |                       |
| CN | 111638721 | A | * | 9/2020  | ........... G05D 1/0825 |
| CN | 112504595 | A |   | 3/2021  |                       |
| CN | 113919190 | A |   | 1/2022  |                       |

* cited by examiner (a)               (b)

701

702

703

702

704

705

706

7031

703

7032

7052

7051

7052

VARIABLE-STROKE SELF-ADAPTIVE ADJUSTMENT QUASI-ZERO STIFFNESS DEVICE AND PARAMETER CHECKING METHOD

CROSS REFERENCE TO RELATED APPLICATIONS

The present disclosure is a national phase entry under 35 USC § 371 of International Application No. PCT/ CN2022/112709, filed on Aug. 16, 2022, which claims the priority of Chinese patent application No. 202110978217. X filed with China National Intellectual Property Administration on Aug. 23, 2021 with the present disclosure title of "A variable-stroke self-adaptive adjustment quasi-zero stiffness device and a parameter checking method of the same", the entire contents of which are incorporated into the present disclosure by reference.

FIELD

The present disclosure relate to a field of micro-vibration tests and experiments of spatial pointing measuring instruments with extremely high precision, in particular to a variable-stroke self-adaptive adjustment quasi-zero stiffness device and a parameter checking method of the same.

BACKGROUND

As the core component for the spacecraft attitude pointing measurement and the spatial target pointing measurement, the spatial pointing measuring instrument can calculate the attitude information of the spacecraft or the pointing information of the spatial target by photoelectric imaging of stars or other spatial targets. The high-performance spacecraft requires the precision of the spatial pointing measuring instrument to be higher than 0.1 arc second, and the influence of the platform micro-vibration environment on the spatial pointing measuring instrument, which was neglected in the past, has attracted great attention.

The sensitive optical element in the pointing measuring instrument with the extremely high precision is slightly disturbed, which will produce a tiny deformation, a rigid body displacement and even a higher-order deformation, thus affecting the pointing accuracy of the optical axis of the pointing measuring instrument. At present, it is an effective means of detection and verification to study the micro-vibration problem of the pointing measuring instrument with the extremely high precision in the ground laboratory environment.

The existing low-stiffness micro-vibration test methods mainly include a suspension method and an air bearing method, and the present disclosure belongs to the suspension method. Most of the existing suspension methods use a flexible rope or an elastic rope to obtain the low stiffness environment needed for the micro-vibration test, but its stiffness is still large and it does not have the ability of variable-stroke adjustment and alignment. The closest related arts to the present disclosure are "A new spacecraft on-orbit ultra-clean weightlessness environment simulation test system (CN106477074)", "A satellite micro-vibration test multi-point suspension system and its design method (CN103482088A)" and "A device for testing influence of satellite platform micro-vibration on camera imaging (CN105530514A)", all of which provide a suspension device, with all the tested objects being suspended by the flexible rope or the elastic rope, so as to meet the low stiffness environment required by the test. However, the stiffness of these three design methods is still relatively large, these three design methods do not have the ability of displacement adjustment and direction adjustment and alignment, and they do not have the ability of adjustment and alignment and quasi-zero stiffness required by the micro-vibration test of the spatial pointing measuring instrument with the extremely high precision.

Therefore, it is an urgent problem to design a simple, reliable, easy to operate, easy to mount and low-cost variable-stroke self-adaptive adjustment quasi-zero stiffness device and a parameter checking method of the same.

SUMMARY

Embodiments of a first aspect of the present disclosure provide a variable-stroke self-adaptive adjustment quasi-zero stiffness device, which includes: an integrating sphere, a target, a collimator, a pointing measuring instrument, a disturbance source, an inertia simulation tooling, a quasi-zero stiffness suspension adjustment device and an optical air-bearing platform. The integrating sphere, the target and the collimator are coaxially arranged on the optical air-bearing platform in sequence. The integrating sphere provides a light source, the target provides point target information, and the collimator simulates infinity. The pointing measuring instrument is an object to be tested, the inertia simulation tooling is a hollow cubic structure, and the pointing measuring instrument is connected and fixed with the inertia simulation tooling through a screw. Three disturbance sources are mounted on the inertia simulation tooling to provide small disturbance and inertia for the pointing measuring instrument. The quasi-zero stiffness suspension adjustment device suspends the inertia simulation tooling to provide a free boundary environment. The quasi-zero stiffness suspension adjustment device, the pointing measuring instrument, the disturbance source and the inertia simulation tooling form a set of two-pendulum system as a whole.

Embodiments of a second aspect of the present disclosure provide a parameter checking method of the variable-stroke self-adaptive adjustment quasi-zero stiffness device according to the embodiments of the first aspect of the present disclosure, which includes: checking a quasi-zero stiffness frequency, where according to the two-pendulum system formed by the quasi-zero stiffness suspension adjustment device, the pointing measuring instrument, the disturbance source and the inertia simulation tooling as a whole, a dynamic equation of the two-pendulum system is established and solved to obtain a characteristic frequency of the variable-stroke self-adaptive adjustment quasi-zero stiffness device; checking a strength, where a shear stress of a spring wire is checked by a strength checking calculation formula of the high-modulus and high-stiffness spring; and checking an adjustment resolution, where an adjustment of the pointing measuring instrument in the U and V directions and a position adjustment of the target on a focal plane of the pointing measuring instrument are realized through the double-stroke bolt assembly.

DETAILED DESCRIPTION

The present disclosure provides a variable-stroke self-adaptive adjustment quasi-zero stiffness device and a parameter checking method of the same. The device is configured as a two-pendulum system, and a quasi-zero stiffness condition of an on-orbit free boundary condition is simulated in a ground laboratory environment through the variable-stroke self-adaptive adjustment quasi-zero stiffness device. Through the design of a variable-stroke and double-stroke adjustment bolt, the adjustment of pitch and yaw attitudes is creatively realized when the pointing measuring instrument is suspended, so that the target is aligned in the focal plane of the pointing measuring instrument. At the same time, the key parameters of the zero stiffness device are effectively checked to ensure that the design of the zero stiffness device meets the requirements and the indexes are reliable. The present disclosure can comprehensively evaluate and quantitatively analyze the influence of the platform micro-vibration environment on the spatial pointing measuring instrument with the extremely high precision.

The present disclosure will be described in detail below with reference to FIGS. 1 to 3 and specific embodiments.

Figure 1:
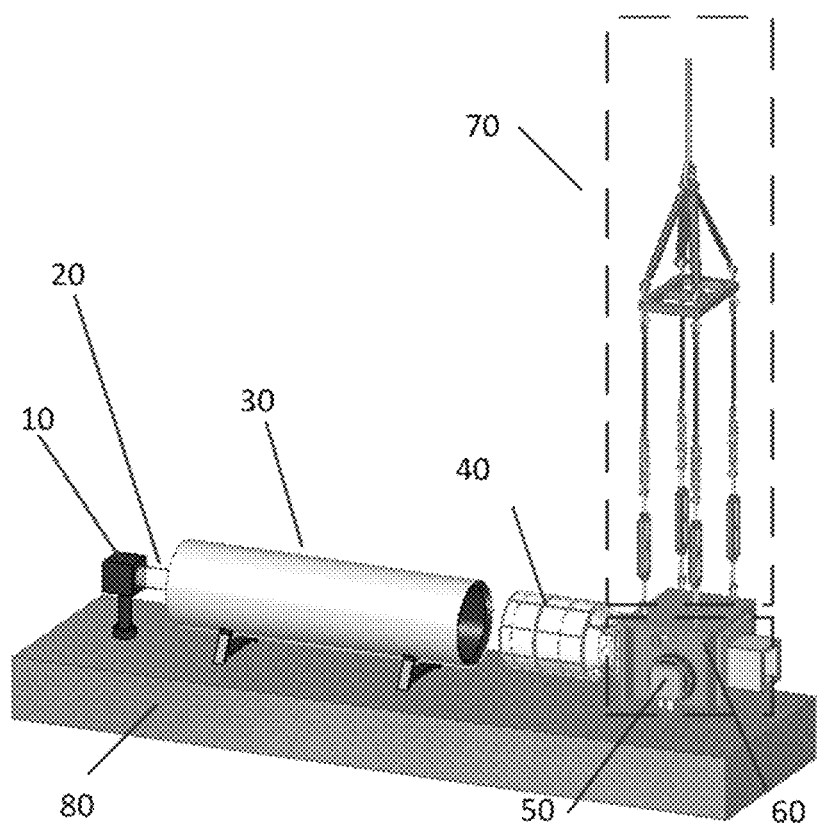
FIG. 1 is a schematic view of the present disclosure.

As shown in FIG. 1, a variable-stroke self-adaptive adjustment quasi-zero stiffness device proposed by the present disclosure includes: an integrating sphere 10, a target 20, a collimator 30, a pointing measuring instrument 40, a disturbance source 50, an inertia simulation tooling 60, a quasi-zero stiffness suspension adjustment device 70 and an optical air-bearing platform 80.

The integrating sphere 10, the target 20 and the collimator 30 are coaxially mounted on the optical air-bearing platform 80 in sequence. The integrating sphere 10 provides a light source, the target 20 provides point target information, and the collimator 30 simulates infinity. The pointing measuring instrument 40 is an object to be tested, the inertia simulation tooling 60 has a hollow cubic structure, and the pointing measuring instrument 40 is connected and fixed with the inertia simulation tooling 60 through a screw. Three disturbance sources 50 are mounted on the inertia simulation tooling 60 to provide small disturbance and inertia for the pointing measuring instrument 40. The quasi-zero stiffness suspension adjustment device 70 suspends the inertia simulation tooling 60 to provide a free boundary environment. The quasi-zero stiffness suspension adjustment device 70, the pointing measuring instrument 40, the disturbance source 50 and the inertia simulation tooling 60 form a set of two-pendulum system as a whole. The basic characteristic frequencies of the two-pendulum system in the present disclosure are 0.114 Hz and 0.295 Hz, respectively.

Figure 2:
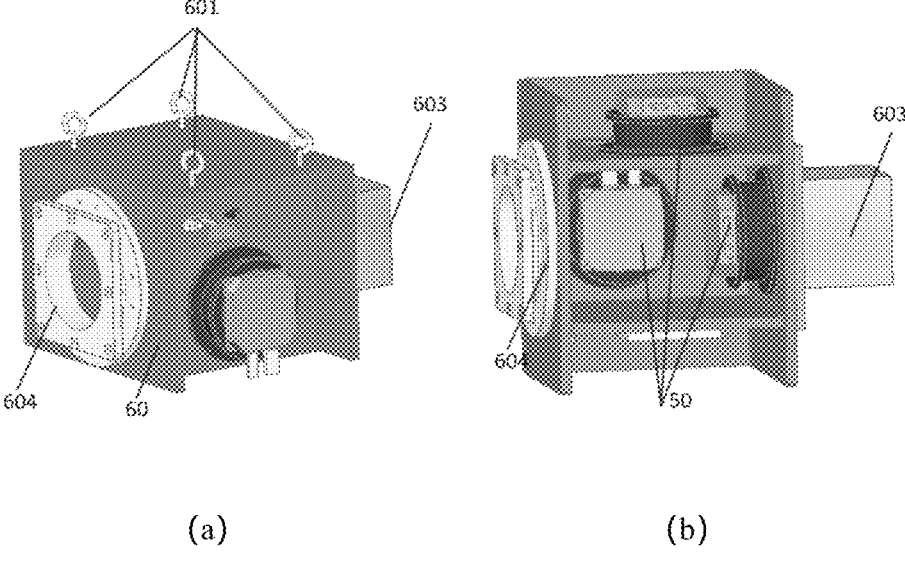
FIG. 2 is a schematic view of an inertia simulation tooling and a disturbance source in the present disclosure.

As shown in FIG. 2, the inertia simulation tooling 60 is provided with a mounting flange 604, and is connected with the pointing measuring instrument 40 through the mounting flange 604, and a counterweight 603 is mounted on a side surface of the inertia simulation tooling 60 opposite to the pointing measuring instrument 40. The three disturbance sources 50 are respectively mounted on three surfaces of the inertia simulation tooling 60, and the normals of the three disturbance sources 50 are perpendicular to each other.

After the inertia simulation tooling 60 is suspended, the direction adjustment of six degrees of freedom of x, y, z, U, V and W is carried out by the quasi-zero stiffness suspension adjustment device 70, so that the pointing measuring instrument 40 faces the collimator 30, where x, y and z are defined to represent three mutually perpendicular coordinate axis directions with a center of mass of the pointing measuring instrument as an origin, z is an optical axis direction, and U, V and W respectively represent directions of degrees of freedom for rotation around the x, y and z axis directions.

Figure 3:
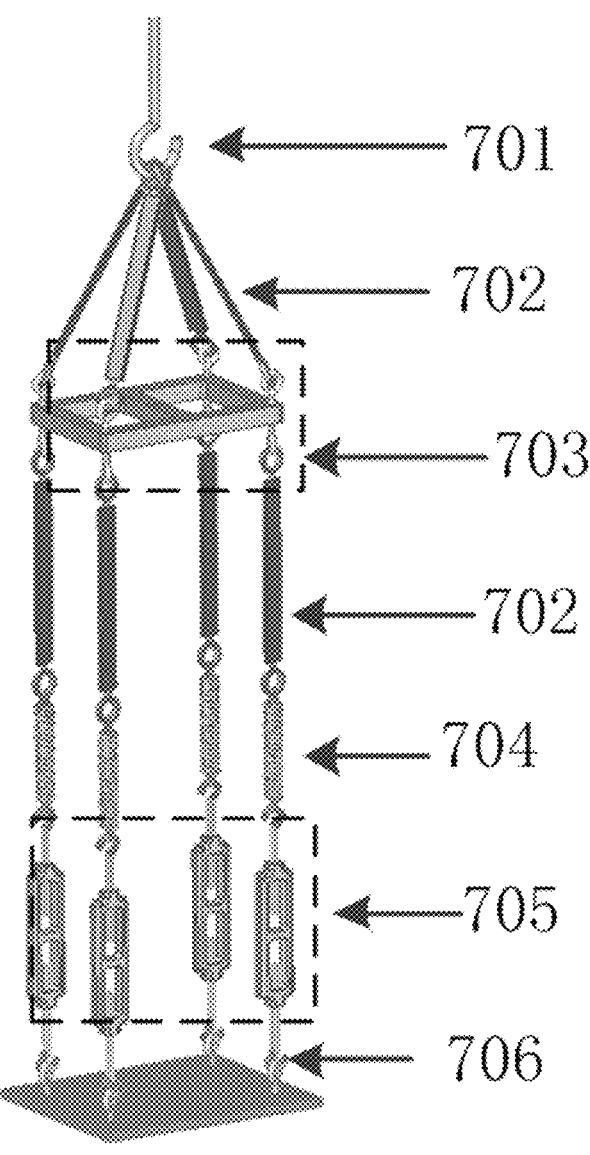
FIG. 3 is a schematic view of a variable-stroke self-adaptive adjustment quasi-zero stiffness device in the present disclosure.
Figure 4:
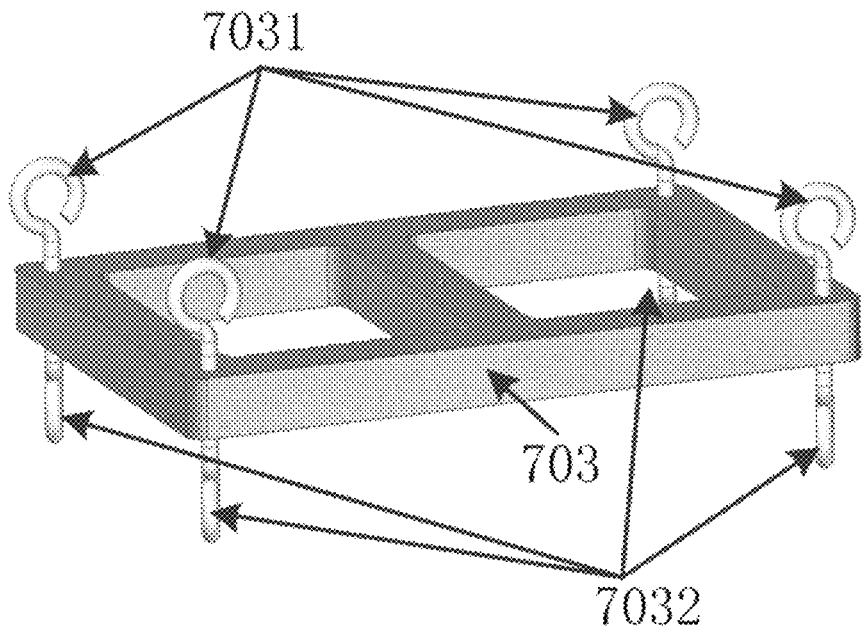
FIG. 4 is a schematic view of a ⊓-shaped tooling and a suspension point in the present disclosure.

As shown in FIG. 3 and FIG. 4, the quasi-zero stiffness suspension adjustment device 70 includes a suspension crown block 701, high-stiffness suspenders 702, a ⊔-shaped tooling 703, a high-modulus and high-stiffness spring 704, a double-stroke bolt assembly 705 and a first suspension point 706. It should be noted that the word "⊓" is a Chinese character, and the phrase "⊓-shaped" means a shape like the Chinese character "⊓".

The ⊔-shaped tooling 703 is arranged horizontally, with four second suspension points 7031 at four corners of its upper end face and four third suspension points 7032 at four corners of its lower end face. The four second suspension points 7031 are respectively connected to the suspension crown block 701 through the high-stiffness suspenders 702, and the four third suspension points 7032 are respectively connected to upper ends of corresponding high-modulus and high-stiffness springs 704 under the ⊔-shaped tooling 703 through the high-stiffness suspenders 702. Lower ends of the four high-modulus and high-stiffness springs 704 are respectively connected to the first suspension points 706 through the double-stroke bolt assemblies 705.

Figure 5:
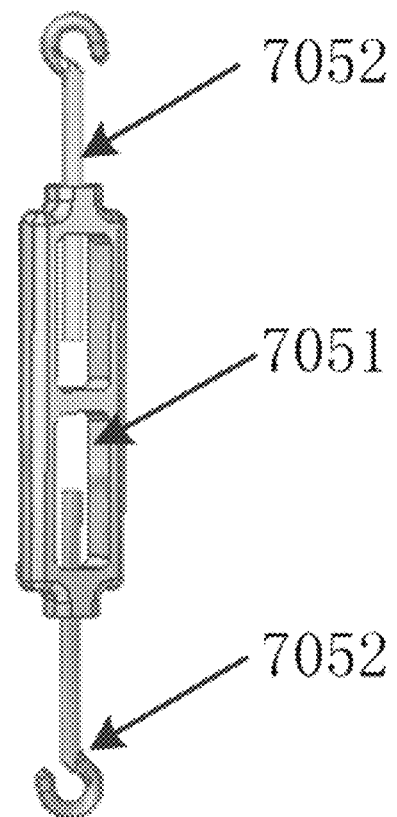
FIG. 5 is a schematic view of a double-stroke bolt assembly in the present disclosure.

The top of the inertia simulation tooling 60 is provided with four hooks 601, which are respectively connected with four first suspension points 706 at a lower end of the quasi-zero stiffness suspension adjustment device 70. The double-stroke bolt assembly 705 includes a two-sided nut frame 7051 and two M16 high-strength bolts 7052, as shown in FIG. 5.

The rated load of the suspension crown block 701 is not less than 5 tons, and the effective length of the wire rope of the crown block is not less than 30 meters. The rated load of the high-stiffness suspender 702 is 300 kilograms, and the effective length of the high-stiffness suspender 702 is 3 meters. The rated loads of suspension points 7031 and 7032 on upper and lower sides of the ⊓-shaped tooling 703 are 300 kilograms. The shear modulus of the high-modulus and high-stiffness spring 704 is not less than 78500 N/mm$^2$, and the ultimate tensile strength of the high-modulus and high-stiffness spring 704 is not less than 1500 MPa. The pitch of the threads of the double-stroke bolt assembly is 1 mm, that is, when the two-sided nut frame rotates by one circle, the stroke in the normal direction of the bolt diameter changes by 2 mm. The integrating sphere 10, the target 20 and the collimator 30 are coaxially mounted on the optical air-bearing platform 80 in sequence, so as to constitute the basic physical environment of the device. The integrating sphere 10 provides a light source, the target 20 provides the point target information, and the collimator 30 simulates the infinity. The pointing measuring instrument 40 is the object to be tested, the inertia simulation tooling 60 has the hollow cubic structure, and the pointing measuring instrument 40 is connected and fixed with the inertia simulation tooling 60 through the screw. Three disturbance sources 50 are mounted on the inertia simulation tooling 60 to provide the small disturbance and inertia for the pointing measuring instrument 40. The quasi-zero stiffness suspension adjustment device 70 suspends the inertia simulation tooling 60 to provide the free boundary environment. The quasi-zero stiffness suspension adjustment device 70, the pointing measuring instrument 40, the disturbance source 50 and the inertia simulation tooling 60 form a set of two-pendulum system as a whole, and the basic characteristic frequencies of the two-pendulum system are 0.114 Hz and 0.295 Hz, respectively. The direction adjustment of six degrees of freedom of the pointing measuring instrument 40 is realized by the quasi-zero stiffness suspension adjustment device 70, so that the center of the pointing measuring instrument 40 is aligned with the axis of the collimator 30.

The parameters of the high-modulus and high-stiffness spring 704 are as follows.

| Name of physical quantity | Value |
| --- | --- |
| Inner Diameter D1 | φ35 mm |
| Middle Diameter D2 | φ40 mm |
| Outer Diameter D | φ45 mm |
| Wire Diameter d | φ5 mm |
| Total Number of Turns N | 80 |
| Pitch p | 5 mm |
| Free Height $H_0$ | 400 mm |
| Modulus of Carbon Spring Steel G | 78500 N/mm² |
| Ultimate Tensile Strength of Carbon Spring Steel Wire $\sigma_b$ | ≥1320 MPa |

The parameter checking is divided into quasi-zero stiffness checking and strength checking. The quasi-zero stiffness checking is to confirm that the designed device meets the quasi-zero stiffness condition and can meet the test requirements. The strength checking is to ensure the safety and reliability of the system, and avoid damages and potential safety hazards.

In the quasi-zero stiffness checking, a variable-stroke self-adaptive adjustment quasi-zero stiffness device is configured as a two-pendulum system, a dynamic equation of the two-pendulum system is established by the Lagrange equation method, and the equation is a second-order implicit differential equation set in two variables, and is solved by the Runge-Kutta numerical solution method to obtain the characteristic frequency of the device, that is, the stiffness value of the variable-stroke self-adaptive adjustment quasi-zero stiffness device.

The strength checking in the present disclosure mainly lies in the strength checking of the high-modulus and high-stiffness spring to ensure safety, and the strength checking mainly uses the strength checking calculation formula of the spring to check the shear stress of the spring wire.

In the adjustment resolution calculation, the adjustment of the pointing measuring instrument in the U and V directions and the position adjustment of the target on the focal plane of the pointing measuring instrument are realized through the double-stroke bolt assembly.

Specifically, the parameter checking in the present disclosure includes three steps.

1. Quasi-Zero Stiffness Frequency Checking

Figure 6:
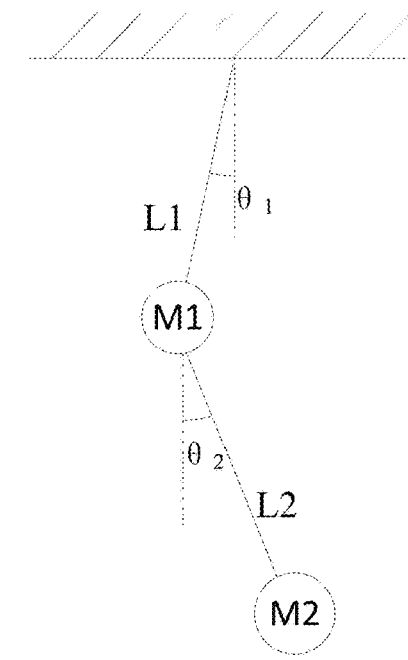
FIG. 6 is a schematic view of a parameter definition of a two-pendulum system in the present disclosure.

As shown in FIG. 6, in the present disclosure, the quasi-zero stiffness suspension adjustment device 70, the pointing measuring instrument 40, the disturbance source 50 and the inertia simulation tooling 60 are integrated into a set of two-pendulum system. If the quasi-zero stiffness suspension adjustment device 70 is regarded as a concentrated mass M1, and the pointing measuring instrument 40, the disturbance source 50 and the inertia simulation tooling 60 are regarded as another object M2, they form a two-pendulum system.

The Lagrange equation method is used to establish the dynamic equation of the two-pendulum system, and the equation is a second-order implicit differential equation set in two variables, and is solved by the Runge-Kutta numerical solution method to obtain the characteristic frequency of the device, that is, the stiffness value of the variable-stroke self-adaptive adjustment quasi-zero stiffness device.

The dynamic equation of the two-pendulum system can be obtained by the Lagrange equation method, as follows:

$$\begin{cases} L_1\ddot{\theta}_1 + \dfrac{m_2}{(m_1+m_2)}L_2\ddot{\theta}_2\cos(\theta_2-\theta_1) - \dfrac{m_2}{(m_1+m_2)}L_2\ddot{\theta}_2\sin(\theta_2-\theta_1) + g\sin\theta_1 = 0 \\ L_2\ddot{\theta}_2 + L_1\ddot{\theta}_1\cos(\theta_2-\theta_1) - L_1\ddot{\theta}_1\sin(\theta_2-\theta_1) + g\sin\theta_2 = 0 \end{cases}.$$

$L_1$ is a length of a first swing arm of the two-pendulum system, $L_2$ is a length of a second swing arm of the two-pendulum system, $m_1$ is an equivalent mass point of the first swing arm of the two-pendulum system, $m_2$ is an equivalent mass point of the second swing arm of the two-pendulum system, g is the gravitational acceleration, $\theta_1$ is an included angle between the first swing arm and the gravitational acceleration g, and $\theta_2$ is an included angle between the second swing arm and the gravitational acceleration g. Two dots on $\theta_1$ and $\theta_2$ represent a second derivative.

Figure 7:
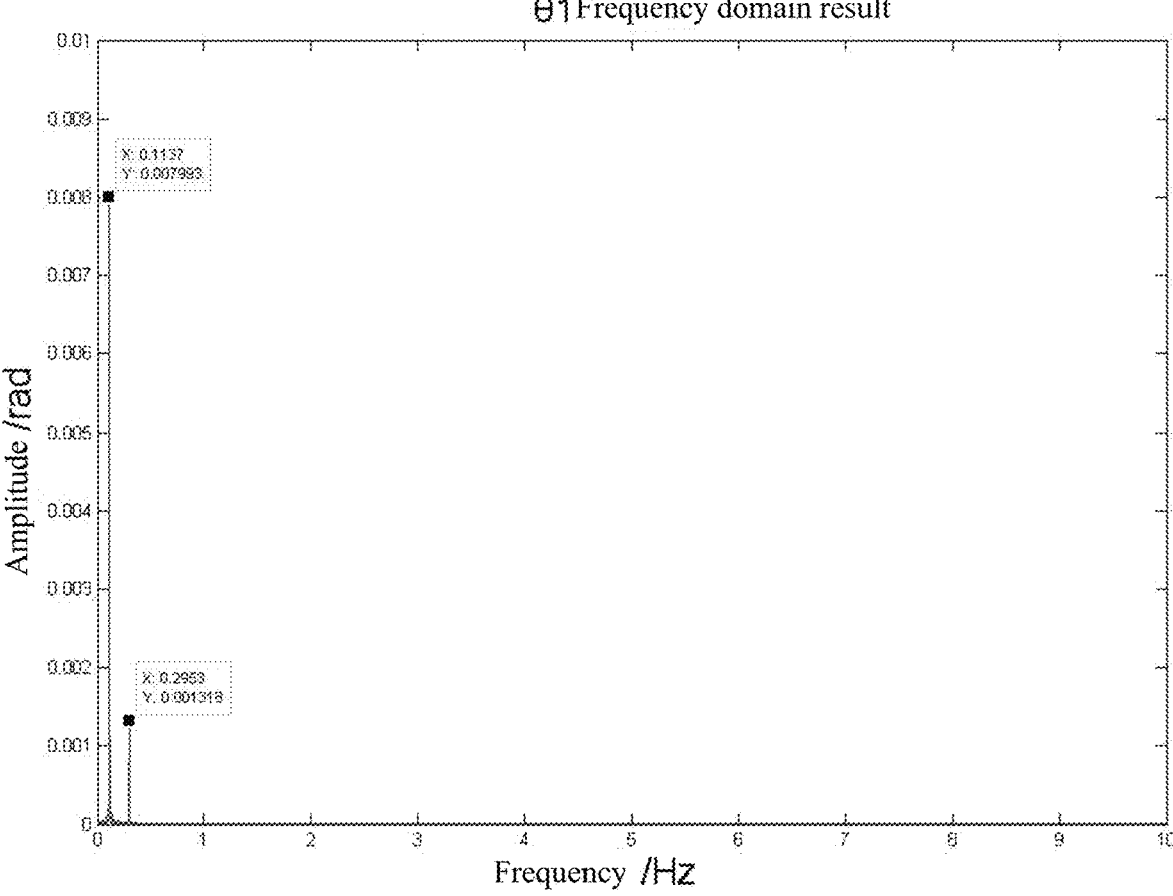
FIG. 7 is a schematic view of a theoretical solution value of a stiffness of a two-pendulum system in the present disclosure.

The ode15i function in Matlab is used to solve the equation, and the result is subjected to a Fast Fourier Transform (FFT) analysis. The characteristic frequencies caused by the two-pendulum system are 0.114 Hz and 0.295 Hz respectively, which are very close to zero stiffness and meet the quasi-zero stiffness condition, as shown in FIG. 7.

At the same time, the quasi-zero stiffness frequency is further checked by using the finite element analysis method, and the transverse characteristic frequencies are 0.13 Hz and 0.27 Hz respectively, which are consistent with the theoretical calculation results, thus proving the quasi-zero stiffness characteristics in the present disclosure again.

2. Strength Checking

The strength checking in the present disclosure mainly lies in the strength checking of the high-modulus and high-stiffness spring to ensure safety, and the strength checking mainly uses the strength checking calculation formula of the spring to check the shear stress of the spring wire.

Common parameters of a cylindrical helical tension spring mainly include:

winding ratio: C=D2/d=8, which generally has a value of 5~8;

effective laps: $N_c$=N−2=78;

compensation coefficient:

$$K = \frac{4C-1}{4C-4} + \frac{0.615}{C} = 1.184;$$

stiffness coefficient:

$$K_p = \frac{Gd^4}{8N_cD_2{}^3} = 1.228N/\text{mm},$$

which is actually measured as 1.9 N/mm;

allowable shear stress: $[\tau]=0.5\sigma_b=660$ Mpa.

For the tension spring, the strength checking mainly checks the shear stress of the spring wire, and the calculation formula for the strength checking of the spring is:

$$\tau_{max} = K\frac{8CF}{\pi d^2} \le [\tau].$$

K represents the compensation coefficient, C represents the winding ratio, F represents a force borne by the spring, d represents the wire diameter of the spring, and $\tau_{max}$ represents an actual shear stress borne by the spring, and $[\tau]$ represents the maximum allowable shear stress of the spring. When the calculation result is $\tau_{max} \leq [\tau]$, it means that the selected spring meets the use requirements.

For example, it is assumed that the maximum load of each spring is one quarter of the whole machine mass, and the whole machine mass is not more than 110 kg.

Each parameter is brought into the equation, and the calculation result is:

$\tau_{max}$=260 MPa<$[\tau]$=660 Mpa, which meets the strength requirement and has a high safety factor.

3. Adjustment Resolution Calculation

The adjustment of the pointing measuring instrument in the U and V directions and the position adjustment of the target in the focal plane of the pointing measuring instrument are realized by the double-stroke bolt assembly.

The adjustment resolution is denoted as:

$$\Theta u = \frac{Zu}{L'} \cdot \frac{180°}{\pi}/3600.$$

Zu represents the pitch, L' represents an effective length of the pointing measuring instrument of the two-pendulum system in the optical axis direction, and the adjustment resolution $\Theta u$ should not be greater than 0.5'.

The target is adjusted to be within the field of view of the pointing measuring instrument through the double-stroke bolt assembly.

For example, the M16 high-strength bolt is used as the double-stroke bolt, and its pitch is 1 mm, that is, when the two-sided nut frame rotates by one circle, a change value at either end of the bolt is 2 mm. Based on this, the adjustment resolution of a single turn is calculated as follows:

$$Z_u = 2 \text{ mm}$$

$$\theta_u = \frac{2}{420} * \frac{180}{\pi} = 0.23°.$$

That is to say, the two-sided nut frame can move 2 mm in the Z direction when rotating by one circle, and a corresponding angle is 0.23°. The resolution during actual operation and adjustment is far better than the above index. If a scale of a single turn is divided into 60 parts, then:

$$Z'_u = 2/60 = 0.03 \text{ mm}$$

$$\theta'_u = \frac{2}{420} * \frac{180}{\pi}/60 * 60 = 0.23'.$$

During the test, the target can be adjusted to be within the field of view of the pointing measuring instrument in a short time through the double-stroke bolt assembly.

The specific object involved in the present disclosure, i.e. the spatial pointing measuring instrument, may also be specifically space optical instruments, photoelectric instruments, and high-precision pointing measuring instruments, such as high-resolution space cameras and sky survey telescopes, which need to be subjected to the quasi-zero stiffness environment to simulate the micro-vibration test of the space instruments with free boundaries.

Compared with the related art, the present disclosure has the following beneficial effects.

The method of the present disclosure provides the variable-stroke self-adaptive adjustment quasi-zero stiffness device and the parameter checking method of the same. The device is configured as the two-pendulum system, and the quasi-zero stiffness condition of the on-orbit free boundary condition can be simulated in the ground laboratory environment through the variable-stroke self-adaptive adjustment quasi-zero stiffness device.

(2) The present disclosure creatively realizes the adjustment of pitch and yaw attitudes when the pointing measuring instrument is suspended through the design of the variable-stroke and double-stroke adjustment bolt assembly, so that the alignment adjustment of the target on the focal plane of the pointing measuring instrument is more convenient, quick and easy to operate.

(3) The present disclosure checks and calculates the key parameters of the variable-stroke self-adaptive adjustment quasi-zero stiffness device, such as the quasi-zero stiffness, the strength and the adjustment resolution, so as to ensure that the design of the zero-stiffness device meets the requirements and that the index is reliable.

(4) The present disclosure has the advantages of a simple structure, an easy operation, a low cost and a high safety, and can comprehensively evaluate and quantitatively analyze the influence of the platform micro-vibration environment on the spatial pointing measuring instrument with the extremely high precision. It can lay a foundation for the engineering implementation and experimental verification of the spatial pointing measuring instrument with the extremely high precision.

Parts of the present disclosure that are not described in detail belong to the common sense of those skill in the art.

The invention claimed is:

1. A variable-stroke self-adaptive adjustment quasi-zero stiffness device, comprising:
   an integrating sphere;
   a target;
   a collimator;
   a pointing measuring instrument;
   a disturbance source;
   an inertia simulation tooling;
   a quasi-zero stiffness suspension adjustment device; and
   an optical air-bearing platform,
wherein:
   the integrating sphere, the target and the collimator are coaxially mounted on the optical air-bearing platform in sequence;
   the integrating sphere provides a light source, the target provides point target information, and the collimator simulates infinity;
   the pointing measuring instrument is an object to be tested, the inertia simulation tooling is a hollow cubic structure, and the pointing measuring instrument is connected and fixed with the inertia simulation tooling through a screw;
   three disturbance sources are mounted on the inertia simulation tooling to provide a disturbance and inertia for the pointing measuring instrument;
   the quasi-zero stiffness suspension adjustment device suspends the inertia simulation tooling to provide a free boundary environment; and
   the quasi-zero stiffness suspension adjustment device, the pointing measuring instrument, the disturbance source and the inertia simulation tooling form a set of two-pendulum system as a whole.

2. The variable-stroke self-adaptive adjustment quasi-zero stiffness device according to claim 1, wherein the inertia simulation tooling comprises a mounting flange, and is connected with the pointing measuring instrument through the mounting flange, and a counterweight is mounted on a side surface of the inertia simulation tooling opposite to the pointing measuring instrument.

3. The variable-stroke self-adaptive adjustment quasi-zero stiffness device according to claim 1, wherein:

after the inertia simulation tooling is suspended, the quasi-zero stiffness suspension adjustment device pre-forms a direction adjustment of six degrees of freedom such that the pointing measuring instrument faces the collimator, the six degrees of freedom comprise x, y, z, U, V, and W, and x, y and z are defined to represent three mutually perpendicular coordinate axis directions with a center of mass of the pointing measuring instrument as an origin, z is an optical axis direction, and U, V and W represent directions of degrees of freedom for rotation around the x, y and z axis directions, respectively.

4. The variable-stroke self-adaptive adjustment quasi-zero stiffness device according to claim 1, wherein characteristic frequencies of the two-pendulum system are 0.114 Hz and 0.295 Hz, respectively.

5. The variable-stroke self-adaptive adjustment quasi-zero stiffness device according to claim 1, wherein three disturbance sources are mounted on three surfaces of the inertia simulation tooling, respectively, and normals of the three disturbance sources are perpendicular to each other.

6. The variable-stroke self-adaptive adjustment quasi-zero stiffness device according to claim 1, wherein the quasi-zero stiffness suspension adjustment device comprises: a suspension crown block, suspenders, a ⊟-shaped tooling, a spring, a double-stroke bolt assembly and a first suspension point;

wherein the ⊢-shaped tooling is arranged horizontally, with four second suspension points at four corners of its upper end face and four third suspension points at four corners of its lower end face; the four second suspension points are respectively connected to the suspension crown block through the high-stiffness suspenders, and the four third suspension points are respectively connected to upper ends of corresponding springs under the ⊟-shaped tooling through the suspenders; and lower ends of four springs each are connected with the first suspension point through the double-stroke bolt assembly.

7. The variable-stroke self-adaptive adjustment quasi-zero stiffness device according to claim 6, wherein a top of the inertia simulation tooling comprises four hooks, which are respectively connected with four first suspension points at a lower end of the quasi-zero stiffness suspension adjustment device; and the double-stroke bolt assembly comprises a two-sided nut frame and two M16 high-strength bolts.

* * * * *